United States Patent [19]

Allen, Jr.

[11] 3,897,968
[45] Aug. 5, 1975

[54] ASPIRATOR-TYPE CONTACT LENS FITTING AID

[75] Inventor: Robert E. Allen, Jr., Laurel, Md.

[73] Assignee: DU-AL Corporation, Laurel, Md.

[22] Filed: Mar. 8, 1974

[21] Appl. No.: 449,504

[52] U.S. Cl. ............................ 294/1 CA; 294/64 A
[51] Int. Cl. .................................................. A61f 9/00
[58] Field of Search ... 294/1 CA, 64 R, 64 A, 64 B; 128/303; 351/160

[56] References Cited
UNITED STATES PATENTS

| | | | |
|---|---|---|---|
| 2,200,800 | 5/1940 | Miller | 294/64 A |
| 2,379,629 | 7/1945 | Eweson | 294/1 CA X |
| 3,095,229 | 6/1963 | Hobbs | 294/64 R |
| 3,129,971 | 4/1964 | Kobler | 294/64 R |
| 3,181,563 | 5/1965 | Giffen | 294/64 A X |
| 3,304,113 | 2/1967 | Hutchison | 294/64 R |

Primary Examiner—Evon C. Blunk
Assistant Examiner—Johnny D. Cherry
Attorney, Agent, or Firm—Griffin, Branigan and Butler

[57] ABSTRACT

A contact and sclera lens fitting aid grips a lens by means of suction created in a venturi fashion. The gripping suction is achieved by directing evaporating freon gases from an aerosol can along a path at a velocity that creates a negative pressure in an intersecting suction passage in communication with a suction cup. In one embodiment, the suction cup is attached by means of a straight, resilient, flexible, transparent tube onto a "venturi housing"/actuator cap which is mounted directly on an aerosol can. In another embodiment the suction cup is mounted on a portable tool which communicates with a can actuator cap by means of a resilient hose. An easy-to-assemble portable tool is described. Embellishments of the invention include directional ribs for aiding a user in directing a contact lens to a correct position on an eye and a lower lid retainer for retaining a lower eyelid in an open position during lens application or removal.

10 Claims, 10 Drawing Figures

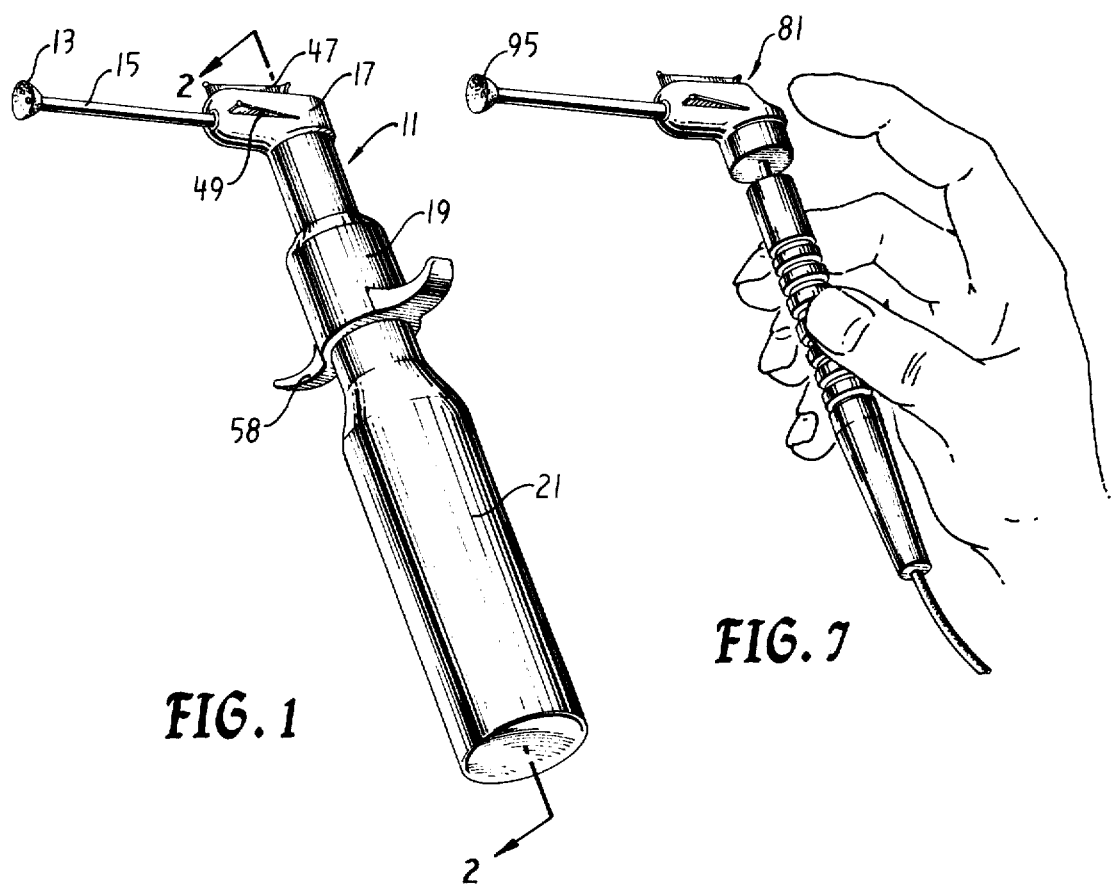
FIG. 1
FIG. 7
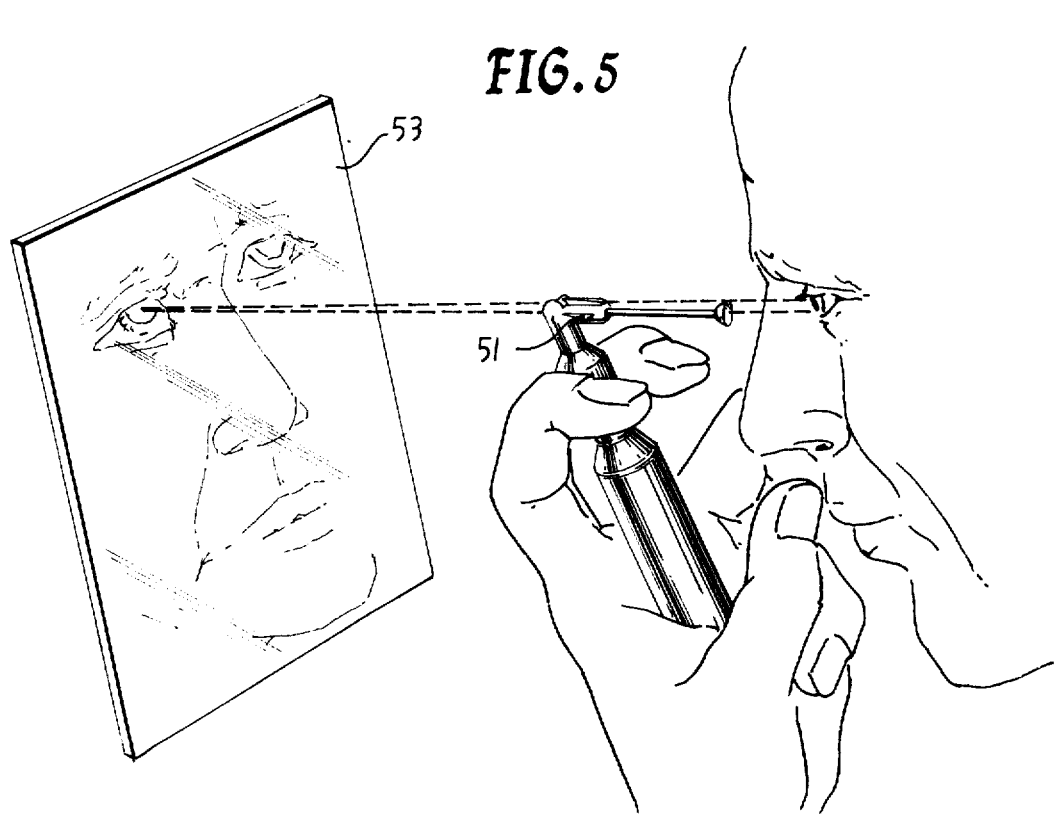
FIG. 5

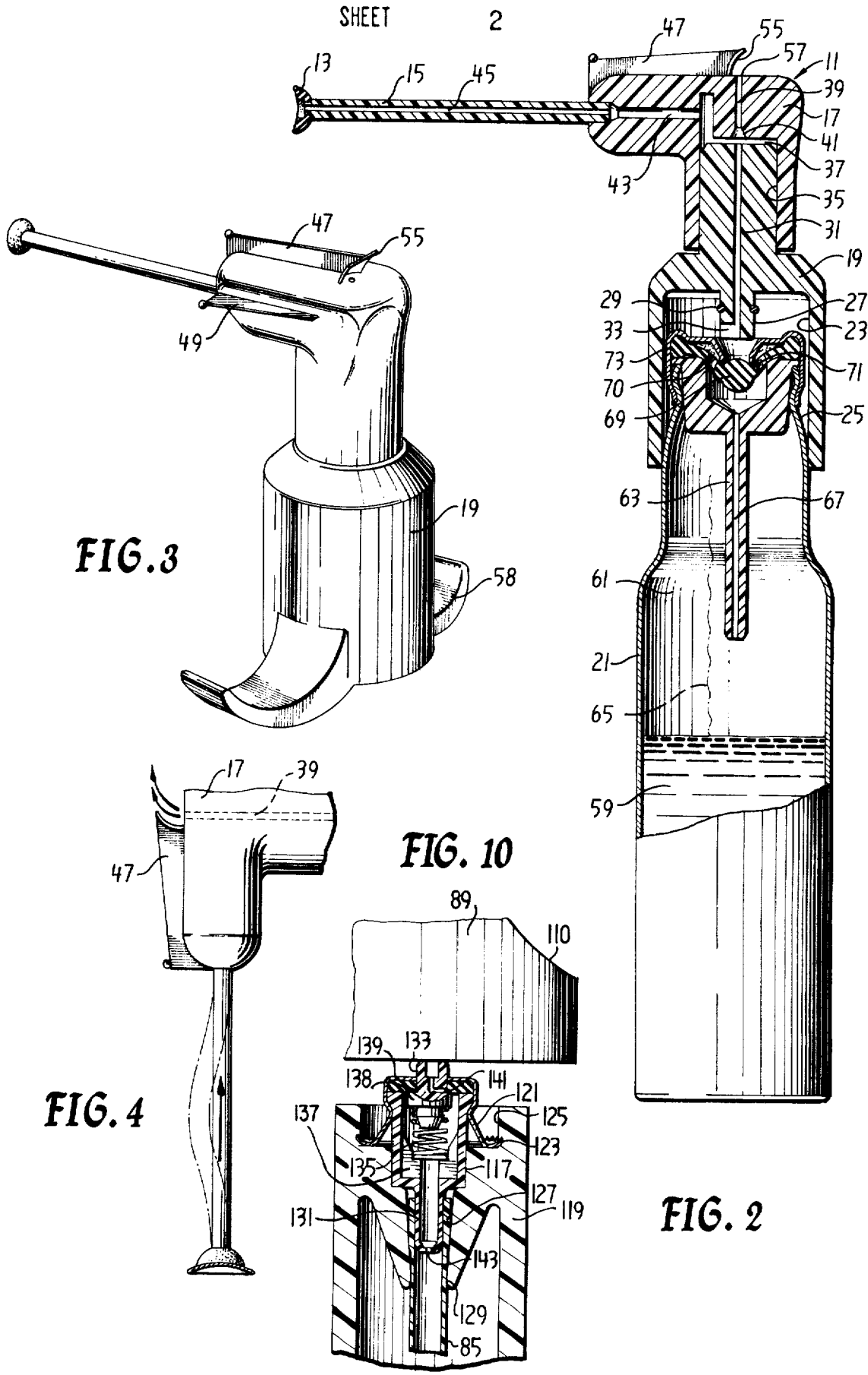

ASPIRATOR-TYPE CONTACT LENS FITTING AID

BACKGROUND OF THE INVENTION

This invention relates generally to the art of contact-lens applicators.

Using the surface tension of a wetting solution applied to the tip of a forefinger, it is common practice for contact lens users to lift and apply lenses by moving them to the corneas of their eyes while holding their eyelids open with the second fingers of the same hand and fingers of opposite hands resting on the tops of their heads. They normally remove lenses by manipulating and/or blinking their eyelids in a manner that will allow air underneath the lenses and thereby release capillary attraction holding the lenses to the corneas.

It has long been recognized that such methods are inadequate in many cases. For example, some people who attempt to use contact lenses cannot easily acclamate themselves to placing things on their eyes with their fingers while others cannot develop sufficient finger-handling dexterity to place lenses on their eyes without damaging or dropping the lenses. Another problem which sometimes arises is that some people simply cannot coordinate the manipulating and blinking necessary to remove lenses. Further, when lens users employ their fingers, it is difficult for them to see what they are doing in mirrors while moving lenses to desired positions. Similarly, where it is necessary for helpers to place lenses on people's eyes, such as adults on children's, fingers make it difficult for the helpers to see what they are doing.

Because of these reasons, and possibly others, numerous devices have been suggested to aid in applying and removing contact lenses. Some of these devices are described in U.S. Pat. Nos. 3,177,874 to Spriggs, 3,304,113 to Hutchinson, 3,583,010 to Woodrum, 3,600,028 to Henning, 3,645,576 to Horres and 3,743,337 to Crary.

Most of the prior-art devices comprise vacuumcreating, "squeeze-bulbs" which communicate with resilient cups. When these devices are used, the squeeze bulbs are depressed while the cups are placed against contact lenses. The squeeze bulbs are then released to create negative pressures which hold the contact lenses on the suction cups. The devices are then used to move the lenses toward or away from the eyes. When it is desired to remove the lenses from the suction cups, the squeeze bulbs are again depressed to relieve the negative pressures. In some such devices, valves are provided for quickly relieving the negative pressures inside the squeeze bulbs. However, such devices have not been generally accepted by ophthalmologists because they have several drawbacks.

One such drawback is that if the suction cups of these devices inadvertently come in contact with outer surfaces of eyes when their squeeze bulbs are depressed, the instinctive reactions of users is to release the squeeze bulbs. This causes negative pressures which adhere the suction cups to the eyes themselves. This, of course, could be damaging to the eyes. It is therefore an object of this invention to provide a contact lens fitting aid which, when manually released, does not maintain a suction that could adhere the device to an eye.

Another disadvantage with most of these devices is that the magnitudes of negative pressures used to hold contact lenses to their suction cups cannot be normally controlled. That is, the negative pressures they employ are either variably low or excessive. In this regard, it is usually desirable to use as little holding force as necessary to prevent damage to an eye in the event that a suction cup is accidently placed directly onto a cornea or sclera. On the other hand, large holding forces are sometimes desirable when heavier sclera type lenses are manipulated. Thus, it is yet another object of this invention to provide a contact lens fitting aid which can be easily arranged to provide an appropriate negative pressure holding force for a designated lens type.

Devices cited in the prior art normally employ suction cups attached, fastened, mounted or otherwise held to rigid housings that tend to accentuate, rather than compensate for, the loss of safety caused by human reflexes or, involuntary responses, to foreign stimuli. It is therefore an object of this invention to provide a contact lens fitting aid which has a suction cup resiliently mounted on a soft, flexible carrier so that when it is accidentally, and suddenly, advanced toward an eye beyond normal limits, the carrier collapses, or folds, to thereby avoid serious damage to the eye.

The removal of lenses with rubber suction cups can, of course, be difficult at times. This is especially true with sclera type lens which are sometimes used in rough sports and is even more especially true with hard fenestrated sclera lenses which are used in the treatment of severe eye diseases. In this respect, the prior-art does not appear to offer a means for maintaining a partial vacuum at a suction cup if the suction cup is placed over an edge of a fenestration. Instead, a fresh attempt is normally necessary before the lense can be lifted. Such a continuing partial vacuum is useful in drawing air beneath a lens to aid in the removal thereof. Thus, it is another object of this invention to provide a continuous means of maintaining a partial vacuum that assists in getting necessary air beneath a lens to break capillary attraction while shifting a suction cup to a vacuum position for lifting and manipulating the lens upon removal.

Some of the prior-art fitting aids have several control mechanisms which must be separately operated, such as squeeze bags and release valve actuators. Such devices are unduly complicated for contact lens users to manipulate. It is therefore still another object of this invention to provide a contact lens fitting aid which has a single control mechanism and is relatively uncomplicated to use.

It is yet another object of this invention to provide a contact lens fitting aid which is not unduly expensive to manufacture.

SUMMARY OF THE INVENTION

According to principles of this invention, a contact lens fitting aid employs evaporating freon gases from an aerosol can to create a venturi-type vacuum in a suction passage. The suction passage communicates with a suction cup, via a resilient, transparent tube, for gripping a contact lens. Several embodiments of, and embellishments to, this concept are described.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is an isometric view of a purse-size contact lens fitting aid of this invention mounted on a small aerosol can;

FIG. 2 is a sectional view taken on line 2—2 of FIG. 1;

FIG. 3 is an isometric view of the contact lens fitting aid of FIG. 1;

FIG. 4 is a side view of the contact lens fitting aid of FIG. 1 when used for picking up or putting down a contact lens;

FIG. 5 is an isometric view illustrating the manner in which the contact lens fitting aid of FIG. 1 is employed;

FIG. 7 is an isometric view of a clinical embodiment contact lens fitting aid of this invention which is separate from an aerosol-can valve actuator;

FIG. 10 is a sectional view of a second embodiment valve arrangement which can be used with the clinical contact lens fitting aid.

DETAILED DESCRIPTION OF THE INVENTION

Figure 6:
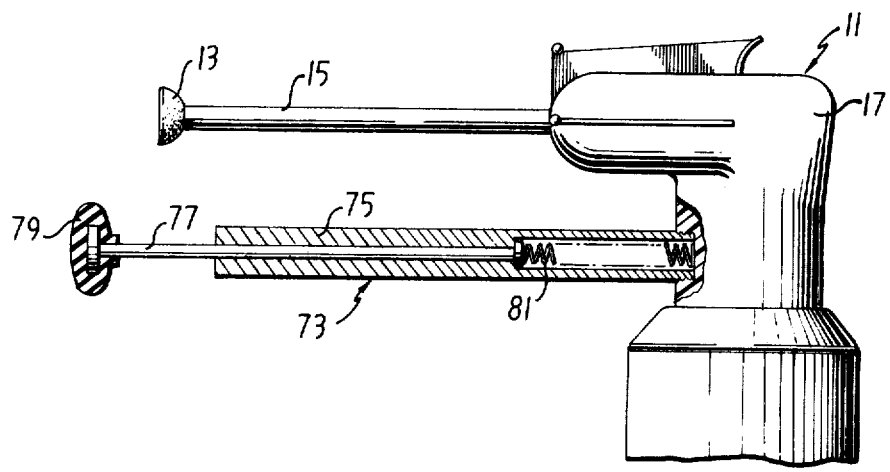
FIG. 6 depicts a portion of a contact lens fitting aid similar to that of FIG. 1 but further including a lower-eyelid retainer.

With reference to FIGS. 1–5, a purse-size contact lens fitting aid 11 is depicted. The purse-size contact lens fitting aid 11 essentially comprises a resilient, rubber, suction cup 13, a transparent, soft, resilient, flexible, plastic suction tube 15, a nozzle portion 17 and an actuator portion 19. The fitting aid 11 is depicted in FIGS. 1, 2, and 5 as being mounted on an aerosol can 21.

The actuator portion 19 defines a cavity 23 for receiving a neck 25 of the aerosol can 21. The actuator portion 19 includes a valve actuator post 27 extending into the cavity 23 and having an O-ring 29 mounted on the outer surface thereof. The valve-actuator post 27 and an upper portion of the actuator portion 19 define a flow passage 31. A lateral vent 33 extends laterally from the flow passage 31 at the bottom end of the valve-actuator post 27.

The nozzle portion 17 defines a cavity 35 in which the upper portion of the actuator portion 19 extends; however, a gap 37 is formed between the upper end of the actuator portion 19 and the top of the nozzle-portion cavity 35. The nozzle portion 17 defines an exhaust passage 39, having a funnel-shape 41 at the lower end thereof, aligned with the flow passage 31. The nozzle portion 17 also defines a nozzle suction passage 43 which communicates with the gap 37.

The suction tube 15 is mounted on the nozzle portion 17 at the end of the nozzle suction passage 43 and defines a tube suction passage 45 which communicates with the nozzle suction passage 43. The suction tube 15 is soft, resilient and flexible to soften any inadvertent or accidental impact of lenses with eyes. In this regard, the suction tube 15 is depicted in FIG. 4 in a bent configuration to illustrate its resiliency.

The suction cup 13 is mounted at the other end of the suction tube 15 with its concaved side facing outwardly but being in communication with the tube suction passage 45.

In the preferred embodiment, the suction cup 13 is 7 millimeters in diameter.

To aid in positioning a contact lens on an eye, top, right and left directional ribs 47, 49 and 51 are mounted on the nozzle portion 17. These ribs are used as is depicted in FIG. 5 to position a contact lens when a mirror 53 is employed by a contact lens wearer. In this regard, when a mirror is not employed, a wearer can stare at a light spot in the middle of the suction cup 13 which is created by exterior light passing through the transparent suction tube 15 to this area.

A gas deflector 55 is also mounted on the top of the nozzle portion 17, at the rear of the top directional rib 47. The gas deflector 55 extends rearwardly over an exhaust port 57 of the exhaust passage 39 and deflects gases exiting therefrom away from a user's head or face.

Finger wings 58 are mounted on the actuator portion 19 to enable a user to pull the fitting aid 11 downwardly, toward the aerosol can 21.

The aerosol can 21 contains pressurized saturated freon which is partially liquid 59 and partially gas 61. The aerosol can 21 has a special abbreviated dip tube 63, the length of which is designed so that when the aerosol can is held upright, as depicted in FIG. 2, it does not extend into the liquid freon 59; further, when the aerosol can 21 is held horizontally, with a liquid level at 65 (FIG. 2), or when it is held with its neck 25 turned slightly downwardly, the end of the dip tube 63 will still not be immersed in the liquid freon 59. In addition, the abbreviated dip tube 63 defines a relatively small passage 67. All of these features are designed so that only gases, and not liquids pass through a dip-tube passage 67.

A disc-like valve member 69, having valve ports 71 is mounted at the upper end of the abbreviated dip tube 63. The valve member 69 is normally pressed against a valve seat 71 to prevent flow of gaseous freon from the aerosol can 21. A valve seat member 73 holds the valve member 69 and the dip tube 63 in position on the aerosol can 21 as is depicted in FIG. 2.

In operation, a user urges the fitting aid 11 down onto the neck 25 of the aerosol can 21 by means of the finger wings 58, as is depicted in FIG. 5. If the user exerts a prescribed pressure, the valve-actuator post 27 urges the valve member 69 away from the valve seat 71 so that evaporating freon gas 61 can pass through the dip-tube passage 67, the valve port 70, the lateral vent 33, the propellant passage 31, and the exhaust passage 39 to outside atmosphere. Thus, a gas flow path is created across the gap 37. This, in turn, creates a negative pressure within the gap 37 in accordance with well known principles explained by Bernoulli's equation as well as by the teachings of Giovanni Venturi. This negative pressure acts through the suction passages 43 and 45 and is applied by the suction cup 13 to a contact lens. The decrease in pressure in the gap 37 is related to the velocity of gaseous freon flow across the gap 37.

In actual practice, a cup, such as suction cup 13, will adhere to a normal contact lens without the use of suction if it is lubricated with a wetting solution. Thus, for applying a normal contact lens, the lens may be merely placed on the suction cup 13 without the use of suction.

However, to remove a lens from an eye, the valve member 69 is activated as described above to create a suction. Further, sclera lenses are heavier than normal contact lenses and these lenses will normally not sufficiently adhere to the suction cup 13 without suction. Thus, when applying these lenses, suction is also usually necessary. Passage sizes are calculated to provide a maximum safe suction; however, up to this maximum amount, the amount of suction can be controlled by applying more or less pressure on the finger wings 58.

Aiming can be accomplished by either using the directional ribs 47, 49 and 51 or by looking at the light spot caused by the transparent suction tube 15, as described above.

The device of FIGS. 1-5 is intended to be portable so that a user can carry it in his pocket or purse.

FIG. 6 depicts a modification of the FIGS. 1-5 embodiment which includes a lower-eyelid retainer 73. The lower-eyelid retainer 73 comprises a housing 75 attached to the nozzle portion 17 of the fitting aid 11. The retainer housing 75 is parallel to the suction tube 15 and allows a plunger 77 to move longitudinally therein. Mounted on the outer end of the plunger 77 is a rubber pad 79. The plunger 77 is normally maintained in an extended position by a compression spring 81 in the housing 75. However, inward pressure on the rubber pad 79 drives the plunger 77 into the housing 75 and compresses the compression spring 81.

In operation, when applying or removing a contact lens, a user places the rubber pad 79 on his lower eyelid and then urges the suction cup 13 toward his eye. The compression spring 81 allows the suction cup 13 to reach the eye while holding the lower eyelid open. This frees a finger for other possible uses.

Figure 8:
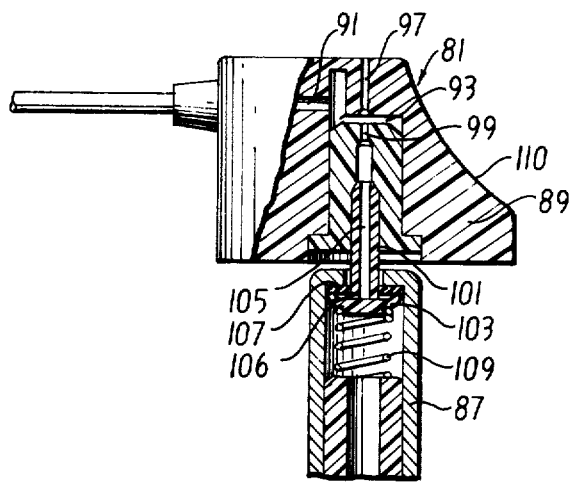
FIG. 8 is a partially cutaway view of the functioning portions of the clinical contact lens fitting aid of FIG. 7.
Figure 9:
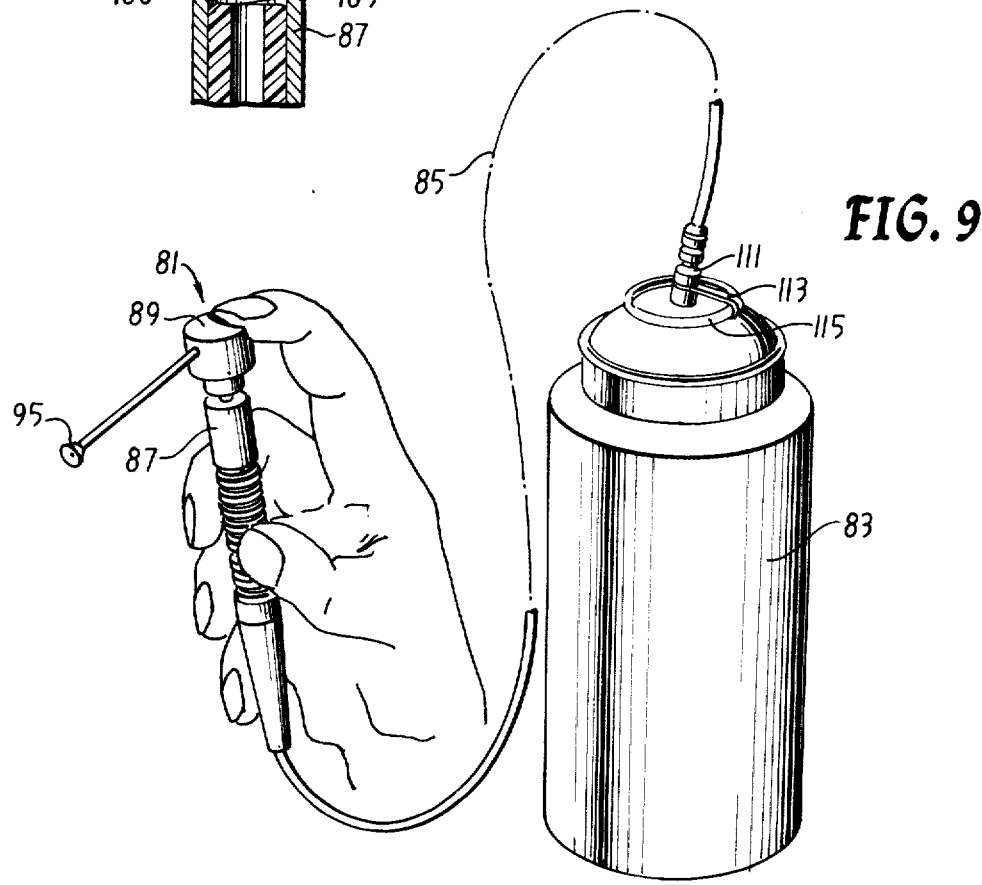
FIG. 9 is an isometric view of the clinical contact lens fitting aid of FIG. 7, and further including a fitting for attaching the lens fitting aid to an aerosol can.

FIGS. 7, 8 and 9 depict a second, clinical embodiment of this invention which is normally for use in an ophthalmic or optical clinic, a doctor's office, or a home. In this embodiment, a contact lens fitting aid 81 is remote from a relatively large aerosol can 83, but is in communication therewith via a hose 85. This fitting aid 81 comprises a hollow handle 87 and an actuator cap 89.

The actuator cap 89 includes a suction passage 91 (FIG. 8) which provides communication between a suction gap 93 and a suction cup 95 (FIGS. 7 and 8). The actuator cap 89 also defines an exhaust passage 97 and a flow passage 99 aligned on opposite sides of the suction gap 93. A valve assembly 101 is a rigid portion of the actuator cap 89 and extends into the hollow handle 87 to form a valve head 103 therein. The valve assembly 101 has a valve-assembly passage 105 for opening to the exterior of the hollow handle 87 at 106, above the valve head 103. The valve head 103 makes sealing contact about its periphery with a rubber washer 107, mounted at the top of the interior of the hollow handle 87. The valve head 103 is urged against the rubber washer 107 by a spring 109.

When a user grips the handle 87 and presses on a finger plate 110 of the actuator cap 89 he urges the valve head 103 away from the rubber washer 107 so that pressurized freon gas inside the hollow handle 87 can enter the valve-assembly passage 105 and cause a fluid stream across the suction gap 93. The rubber washer 107 abuts against the outer surface of the valve assembly 101 to prevent the escape of freon gas around its outer surface.

The hose 85 is attached to the aerosol can 83 by means of an actuator fitting 111. The actuator fitting 111 actuates a valve in the aerosol can 83 when it is urged laterally, as is depicted in FIG. 9. It is not thought necessary to go into the details of this valve for the purpose of this invention. The actuator fitting 111 is provided with a hook 113 for hooking a lip 115 of the can 83 to hold the actuator fitting 111 in a valve-actuating position.

In operation, after the actuator fitting 111 is properly mounted on the aerosol can 83 and placed in a valve actuating position, a user presses the finger plate 110 to open the valve 103 and cause a gas stream across the suction gap 93. This creates a negative pressure in the suction cup 95 for gripping a contact lens.

FIG. 10 discloses an embodiment of this invention similar to the FIGS. 7-9 embodiment wherein a plastic valve housing 117, a handle 119, and the hose 85 can be easily assembled in one action. The valve housing 117 is enclosed by a skirt 121 which has a serrated peripheral edge 123.

The handle 119 defines a mounting cavity 125, the diameter of which is slightly smaller than the diameter of the serrated edge 123, and a funnel-shaped connecting passage 127, which is slightly larger in diameter than the hose 85 at its upper end and slightly smaller than the diameter of the hose 85 at its lower end 129.

To assemble the valve housing 117, the handle 119, and the hose 85, the hose 85 is inserted upwardly into the connecting passage 127 and the valve housing 117 is inserted downwardly into the seating cavity 125 and the connecting passage 127. A male connecting portion 131 of the valve housing 117 extends into the hose 85 and expands the hose 85 outwardly against the surface of the connecting passage 127. Thus, the hose 85, the valve housing 117, and the handle 119 are force fitted together. The serrated edge 123 is urged outwardly by the resilience of the skirt 121 against the surface of the seating cavity 125 so that once the valve housing 117 is forced into the handle 119 it is held in position.

The valve of the FIG. 10 embodiment comprises a valve stem assembly 133 and a spring 135. The spring 135 is compressed between ribs 137, which are integral with the valve housing 117, and the valve stem assembly 133 to urge a head portion 138 of the valve stem assembly against a rubber gasket 139 which is held on the end of the valve housing 117 by the skirt 121. The valve stem assembly 133 has a stem orifice 141 therein which is covered by the seat portion 139 when the valve stem assembly is fully in an upward position; however, when the actuator cap 89 is pressed downwardly on the valve stem assembly 133, the stem orifice 141 is uncovered to allow flow from the hose 85 through a valve body orifice 143 and the stem orifice 141 into the actuator cap 89. Otherwise, the device of FIG. 10 operates as described above in relation to FIGS. 7-9.

The contact lens fitting aids described herein are relatively easy to operate and provide controllable negative gripping pressures at the suction cups thereof.

Further, when these devices are manually released by users their negative pressures are cut off so that eye surfaces are not inadvertently gripped by their suction cups.

In addition, the devices are relatively easy to use and inexpensive to manufacture.

Still further, with these devices continuous suction at the suction cups thereof can be created to encourage the entering of air under lenses for their removal.

Also, the contact lens fitting aids described herein, when removed from the aerosol cans, are relatively small and can, therefore, be easily stored in contamination free carrying cases.

While the invention has been particularly shown and described with reference to a preferred embodiment, it will be understood by those skilled in the art that various changes in form and detail may be made therein without departing from the spirit or scope of the invention. For example, the lower lid retainer 73 described for use with the embodiment of FIGS. 1-5 could also be used with the embodiment of FIGS. 7-9.

The embodiments of the invention in which exclusive property or privilege are claimed are defined as follows:

1. A contact-type lens fitting aid for use with a portable aerosol-like can of pressurized gas, said fitting aid comprising:
    a single soft, resilient suction cup of a size for entering between human eyelids for gripping lenses positionable on eyeballs, said suction cup having an opening therein for providing communication between a gripping side of said suction cup and a suction passage;
    a suction creating device comprising:
        a valve actuator means for selectively controlling a valve which controls the flow of said pressurized gas from said aerosol-like can to a narrow-passage;
        a directing means for defining said narrow passage and for directing flow from said gas source means along said narrow passage; and
        a means for defining said suction passage to intersect said narrow passage, whereby said gas flow creates a suction in said suction passage which causes said suction cup to grip said lenses.

2. A contact-type lens fitting aid as claimed in claim 1 wherein said fitting aid comprises a can actuator cap which is seated directly upon said portable aerosol-like can and which defines said directing means, the portion of said suction passage which intersects said narrow passage and said valve actuator means.

3. A contact-type lens fitting aid as claimed in claim 1 wherein said fitting aid comprises a valve actuator cap which defines said directing means, the portion of said suction passage which intersects said narrow passage and said valve actuating means, and wherein said contact-type lens fitting aid further includes a valve which is located remotely from said aerosol-like can and which is actuated by said valve actuating means, and wherein is further included a hose for connecting said valve to said aerosol-like can and a means for actuating an additional valve at said aerosol-like can to continuously release pressurized gas to said hose.

4. A contact-type lens fitting aid as claimed in claim 1 wherein is further included at least one directional rib extending radially from said suction passage for aiding a user in positioning a contact lens.

5. A contact-type lens fitting aid as claimed in claim 1 wherein is further included an eyelid retainer extending parallel to said suction passage beyond said suction cup and having a resilient pad mounted on the outer end thereof, said lid retainer being compressible but including a biasing means for urging said lid retainer toward an extended attitude, whereby said resilient pad can be placed on an eyelid to hold said eyelid in an open position as said suction cup is moved toward said eye.

6. A contact-type lens fitting aid as claimed in claim 5 wherein said lid retainer comprises a plunger telescoping inside a cylinder and wherein a spring is mounted inside said cylinder to urge said plunger toward an extended position.

7. A contact-type lens fitting aid as claimed in claim 1 wherein said means for defining said suction passage includes an elongated, transparent tube on which said suction cup is mounted, through which exterior light is passed to create a light spot in the middle of said suction cup on the gripping side thereof.

8. A contact-type lens fitting aid as claimed in claim 7 wherein said elongated transparent tube is relatively soft, resilient and flexible for absorbing impacts of lenses with eyes.

9. A contact-type lens fitting aid for use with a source of pressurized gas, said fitting aid comprising:
    a tool separate from said source of pressurized gas;
    a resilient hose for connecting said tool to said source of pressurized gas;
    wherein said tool comprises:
        a suction cup for gripping lenses, said suction cup having an opening therein for providing communication between the gripping side of the suction cup and a suction passage;
        a suction creating device comprising:
            a handle for defining a valve-assembly cavity for receiving a valve assembly means and a hose-connecting passage for receiving said hose;
            a valve-assembly means for selectively controlling the flow of said pressurized gas through said resilient hose and through a narrow passage defined by said tool said valve-assembly means including a valve skirt means for gripping said valve assembly, said skirt having an outer edge which is normally slightly larger than the diameter of the valve cavity, and which is serrated, said skirt being resilient for urging said serrated edge radially outwardly when it is pressed inwardly, whereby, when said valve-assembly means is pressed into said valve-assembly cavity, said serrated edge grips the walls of said cavity to hold said valve assembly means in said cavity;
            a directing means for defining said narrow passage and for directing the gas flow from said hose along said narrow passage; and
            a means for defining said suction passage to intersect said narrow passage, whereby said gas flow creates a suction in said suction passage which causes said suction cup to grip said lenses.

10. A contact-type lens fitting aid as claimed in claim 9 wherein said valve-assembly means includes a tubular protruding inlet member for extending into said hose-connecting passage when said valve-assembly means is mounted in said valve cavity, said protruding inlet member having an outer diameter which is approximately the same size as the smallest portion of the hose-connecting passage;
    whereby said protruding inlet member may protrude into a hose in said hose-connecting passage to clamp said hose in said passage.

* * * * *